No. 776,936. PATENTED DEC. 6, 1904.
A. PUSTERLA.
PLEASURE WATERWAY.
APPLICATION FILED APR. 11, 1904.
NO MODEL.

No. 776,936. Patented December 6, 1904.

UNITED STATES PATENT OFFICE.

ATTILIO PUSTERLA, OF ST. LOUIS, MISSOURI.

PLEASURE-WATERWAY.

SPECIFICATION forming part of Letters Patent No. 776,936, dated December 6, 1904.

Application filed April 11, 1904. Serial No. 202,630. (No model.)

*To all whom it may concern:*

Be it known that I, ATTILIO PUSTERLA, a subject of the King of Italy, residing at 1219 Hodiamont avenue, St. Louis, Missouri, have invented certain new and useful Improvements in Pleasure-Waterways; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to pleasure-waterways, and has for its object the arrangement of a trough or canal having a plurality of convolutions that are both helically and substantially spirally arranged, the ends of the trough being contiguous, but at different levels, and a portion of the channel passing under one or more convolutions and through a tunnel under said convolutions. The arrangement is such that the helix being comparatively flat gives the appearance of a whirlpool, at the center of which the boats and their passengers appear to be engulfed. I also avoid the construction of basins in the waterway, thereby using but a comparatively small quantity of water.

Details of construction will be more particularly described and hereinafter claimed.

Figure 1:
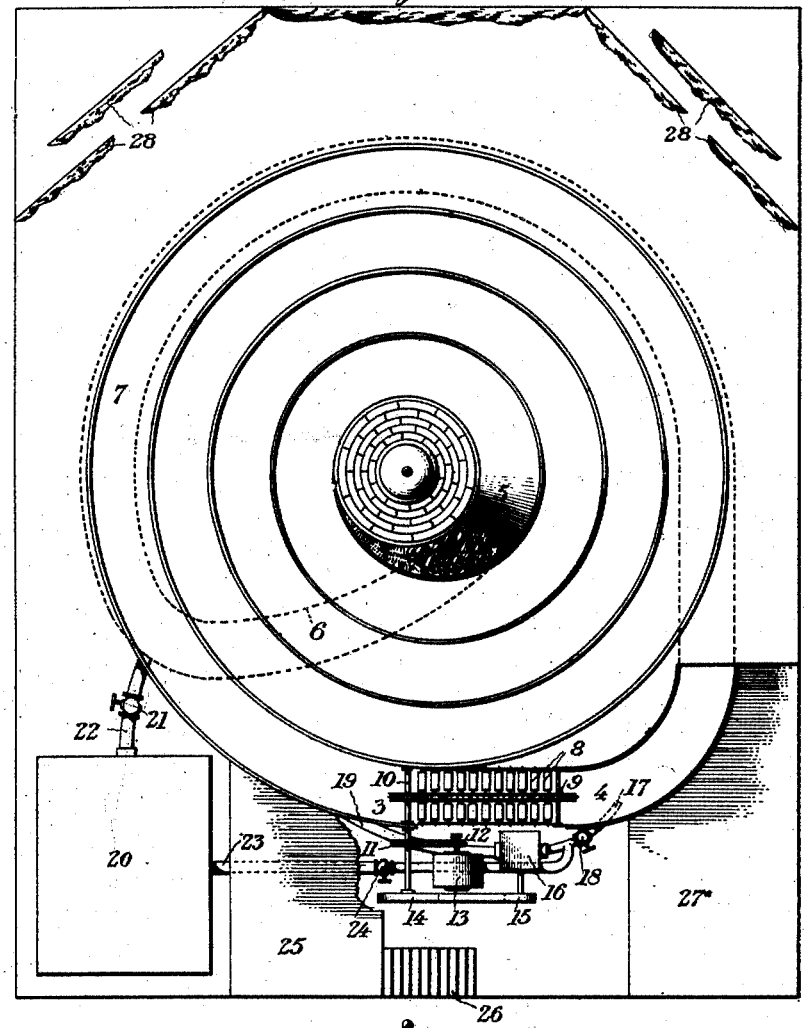
Figure 2:
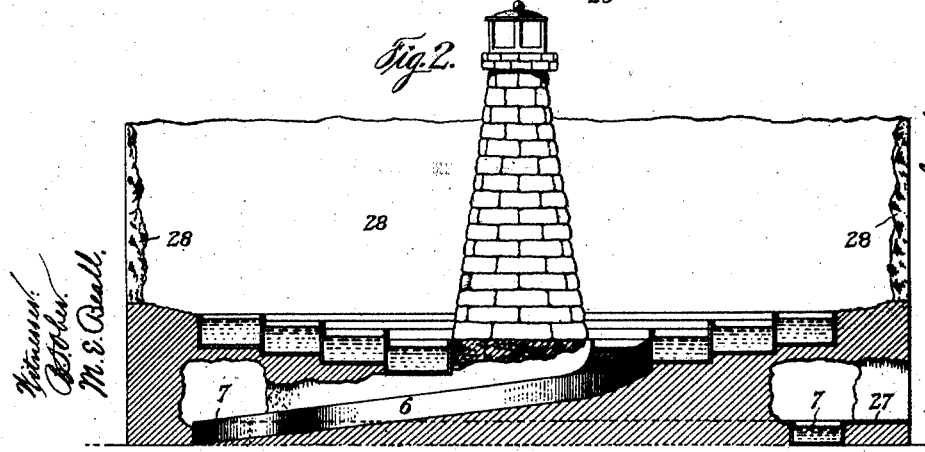

Referring to the drawings, in which like parts are similarly designated, Figure 1 is a plan not showing the water therein; and Fig. 2 is a view, partly in section and partly in elevation, to clearly show the helical and spiral arrangement.

The beginning of the trough or channel at 3 is separated from and at a higher level than the end 4. The trough continues from 3 spirally to a center with a substantially continuous decline to a point 5 near the center, at which point the decline is greater, and thence passes under the convolutions of the helical spiral through a tunnel 6 to a continuation thereof 7, which is either level or has but a slight decline to the end at 4. Between the ends 4 and 3 there is a roller-way 8 and a sprocket-chain 9, having the usual pins to engage recesses in the bottom of the boats to lift them to the higher starting-point 3. The chain is driven by a shaft 10, having a chain-wheel 11, driven by a sprocket 12 on a motor 13. The shaft 10 also carries a belt-wheel 14, belted to a wheel 15, driving a centrifugal pump 16. This pump has a suction-pipe 17, provided with a valve 18, that normally draws its supply of water from the lower end 4 of the spiral trough and delivers to the higher end 3 through a pipe 19.

A reservoir 20 is connected to the lower part of the trough and here shown as the lower spiral 7 in the tunnel. A valve 21 in the connecting-pipe 22 allows the reservoir to be cut out under normal conditions of working. This reservoir is also connected by a pipe 23, having a valve 24, to the suction end of the pump 16.

There is, as usual, an elevated platform 25, reached by steps 26, and from which the passengers enter the boats to begin their trip through the whirlpool and a second platform, 27, at the lower level where the passengers disembark. The whole of the basin is preferably surrounded by scenery 28.

The operation is as follows: The reservoir 20 is filled with water, the valves 17 and 21 being closed, and then the motor 13 set in motion to operate the pump. Valve 24 in pipe 23 being open, water will then be drawn from the reservoir 20 and delivered to the upper end 3 of the channel and run down its course to the lower end 4. The valve 17 is then gradually opened, so that the pump 16 will draw both from the end of the channel and from the reservoir, and the valve 24 is gradually closed until the supply in the reservoir is exhausted or until there is sufficient water in the waterway, when the valve 24 is entirely closed and the one 17 fully opened and the device in normal operation, the pump pumping water only from the end 4 to the beginning 3 of the trough. When it is desired to close the place or by reason of an accident to the machinery, the pump is temporarily unoperated, the valve 21 in pipe 22 is opened, and the water in the canal is drained into the reservoir 20. Passenger-boats start at 3 through the spiral channel to a point 5 near rocks at the central lighthouse, where they disappear into the tunnel 6 and where the trough has a slightly-greater incline to the lower part 7 to emerge at platform 27. After the passengers are discharged the boats are lifted over the roller-way to the upper end 3 of the trough to begin another journey.

Having thus described my invention, what I claim as new therein, and desire to secure by Letters Patent, is—

1. A pleasure-waterway, comprising a spiral channel having contiguous ends at different levels and means to pump water from the lower end of the channel into the upper end thereof, substantially as described.

2. In a pleasure-waterway, a spiral helical channel having contiguous ends at different levels, substantially as described.

3. In a pleasure-waterway, a spiral channel having a portion thereof crossing the convolutions of the spiral at a lower level, substantially as described.

4. In a pleasure-way, a spiral canal having a portion crossing the convolutions thereof, substantially as described.

5. In a pleasure-way, a spiral helical course having a portion crossing the convolutions thereof at a different level, substantially as described.

6. In a pleasure-way, a spiral course having a portion crossing convolutions thereof at a different level, substantially as described.

7. In a pleasure-waterway, a spiral helical channel terminating near the center and a portion of said channel passing through a tunnel and across convolutions of the spiral to a lower level, substantially as described.

8. In a pleasure-waterway, a spiral helical channel entering near the center of the spiral, a tunnel, said channel passing beneath the spiral and across convolutions thereof through the tunnel and terminating contiguous to the beginning of the channel, substantially as described.

9. In a pleasure-waterway, a spiral helical channel having contiguous ends, means to pump water from one of the contiguous ends to the other, and a drainage-reservoir connected to a lower level of the channel, substantially as described.

10. In a pleasure-waterway, a spiral helical channel, a pump to pump water from the lower to the higher end of the channel, a drainage-reservoir connected to a lower level of the channel and a suction-pipe between the reservoir and suction side of the pump, substantially as described.

11. In a pleasure-waterway, a spiral helical channel having contiguous ends, a pump to pump water from the lower to the higher end and having a valved suction-pipe, a drainage-reservoir having a valve connection with a lower level of said channel, a valve-controlled pipe connecting said reservoir with the suction side of the pump and means to transfer boats from the lower to the higher end of said channel, substantially as described.

12. In a pleasure-waterway, a spiral helical trough, a portion of said trough passing across convolutions of the spiral through a tunnel, substantially as described.

In testimony that I claim the foregoing as my invention I have signed my name in presence of two subscribing witnesses.

ATTILIO PUSTERLA.

Witnesses:
PARTO TESTI,
S. MONDIOLI.